Sept. 3, 1968     K. L. MAGEE     3,399,517
HARVESTER HEADER
Filed Aug. 20, 1965     2 Sheets-Sheet 2
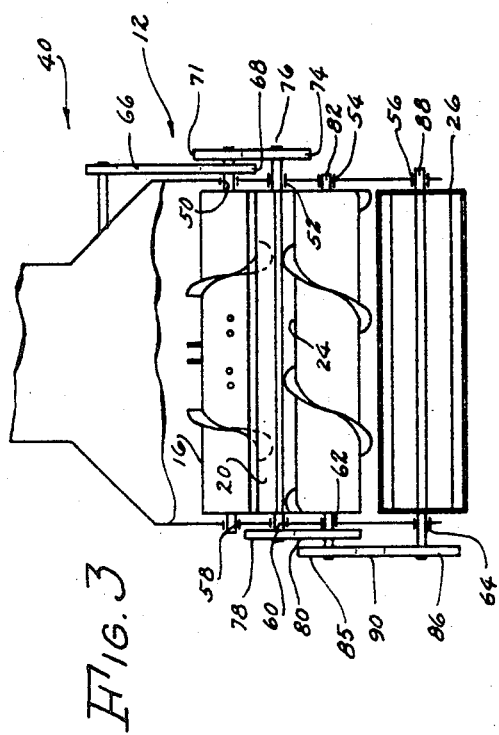
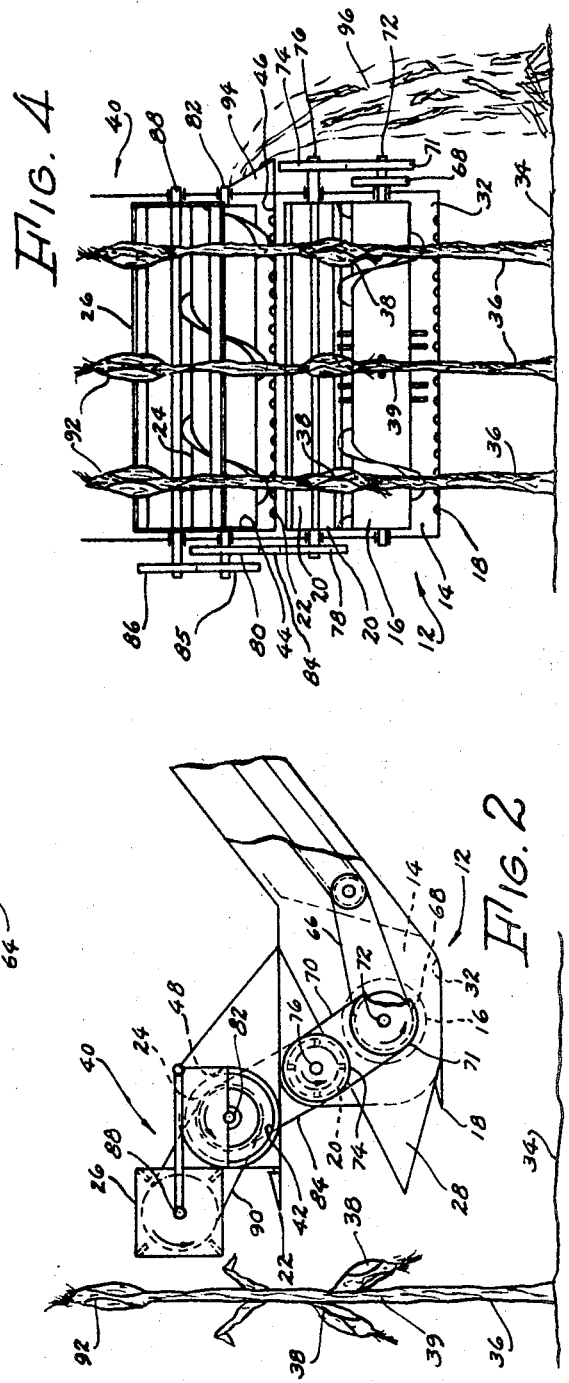
INVENTOR
KENNETH L. MAGEE United States Patent Office 3,399,517
Patented Sept. 3, 1968

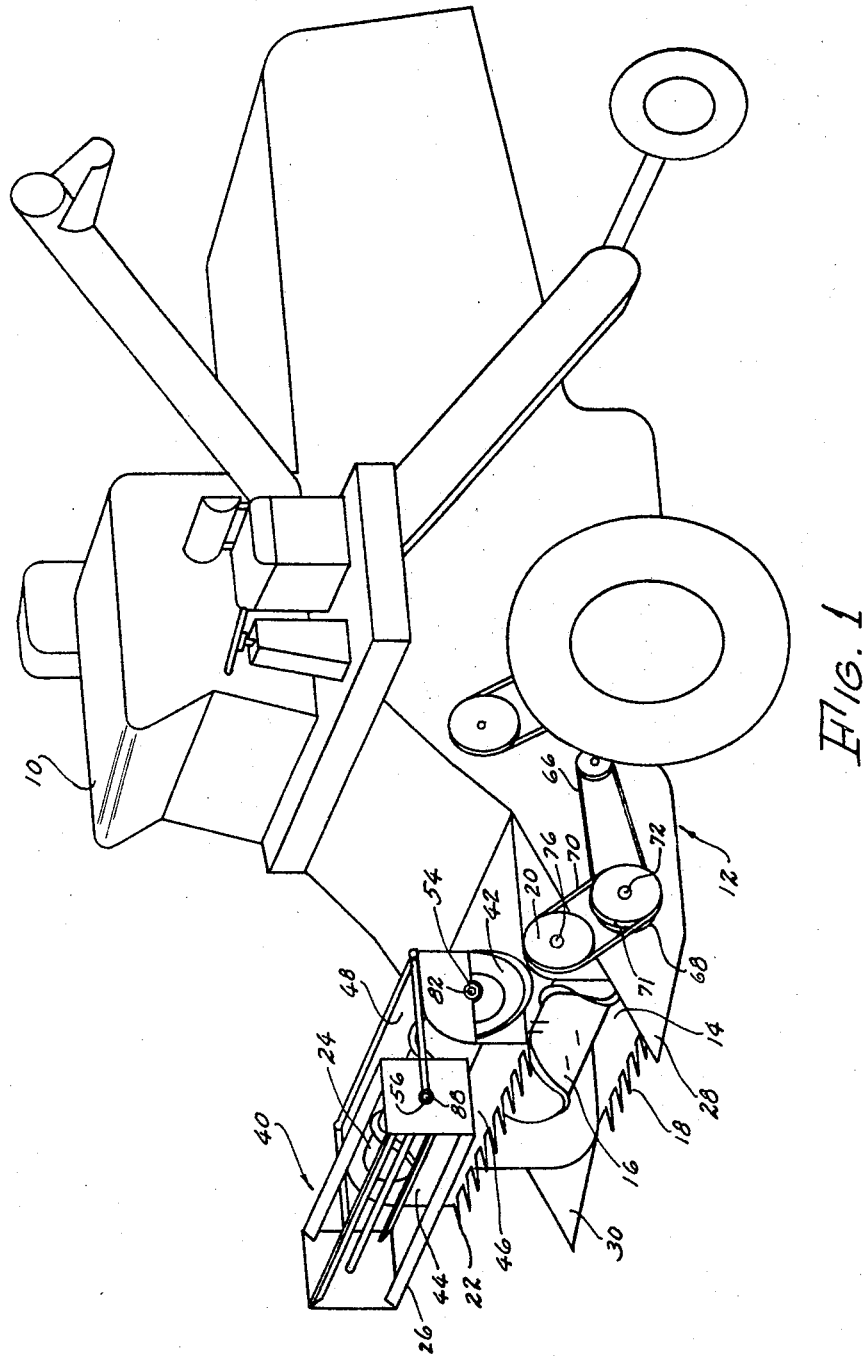

3,399,517
HARVESTER HEADER
Kenneth L. Magee, Racine, Wis., assignor to J. I. Case Company, Racine, Wis., a corporation of Wisconsin
Filed Aug. 20, 1965, Ser. No. 481,163
5 Claims. (Cl. 56—17)

ABSTRACT OF THE DISCLOSURE

A harvester header including one crop cutter and one conveyor operatively mounted forwardly on the harvester. Another crop cutter and another conveyor are also mounted forwardly on the harvester, and they are mounted forwardly and above the first-mentioned crop cutter and crop conveyor. The last mentioned crop conveyor has means for discharging the cut crop away from the forward path of movement of the harvester.

---

This invention relates to harvesters and particularly to the headers on corn harvesters of the type which cut and harvest several rows of corn at one time. Specifically, the invention discloses a means for "side-stepping" or diverting a portion of crop material from the harvesting mechanism.

It is well known that a grain harvester does it best work when the harvesting mechanism does not have to contend with a large amount of bulky or stalk material. This is extremely important in those machines which cut off the stalks of material as differentiated from those machines which pick or cut only the grain portions of the crop material. The most advantageous operation is to cut the crop material at a height so as to obtain the maximum amount of grain and the minimum amount of stalk material for passing through the harvester. When harvesting wheat, for example, the header is normally set to cut the stalk a few inches under the wheat heads, thus minimizing the amount of stalk material that must pass through the harvester or combine. The advantage of having "clean wheat" for sale is well known.

However, when harvesting corn with either a row-crop harvester or with a combine type harvester, the header or cutting mechanism usually must be set low to cut the stalk and to gather in the lowest ears. Since the mature ears of corn grow at varying heights on the corn stalk, it is necessary to cut several feet of the stalk in order to get all the corn. Most corn and like row crop grains are planted in rows 38 to 40 inches apart, and this also may account for differences in height of the mature grain on the stalk due to uneven or hilly land. Therefore, an unusually large amount of bulk or stalk material must pass through the harvester with the ears of corn, and the harvester cannot do a thorough job of providing clean grain.

The principal object of this invention is to provide a means for cutting and disposing of a portion of crop material not desired to be harvested.

Another object is to provide an auxiliary header to cut and remove the top portions only of the corn stalks.

A further object is to provide means for conveying the cut top portions of the corn stalks away from the front of the machine.

An additional object is to provide an auxiliary header which can be mounted directly on the main header without removing the conventional cutting mechanism.

Further objects and advantages will become apparent from the following specification and the annexed drawings, in which:

FIGURE 1 is a perspective view of a harvester embodying the invention;

FIG. 2 is a side elevational view of the invention;
FIG. 3 is a plan view of the same; and
FIG. 4 is a front elevation of the invention working three rows of crop material.

The invention is shown as a part of a combine type harvester 10, as shown in FIG. 1. Harvester 10 is disclosed as a self-propelled machine although the invention could be applied to a pull-type combine or harvester as desired. Also, the invention is described as an attachment or auxiliary header for harvesting corn, but it should be understood that the combine as shown could be utilized for harvesting other like row crop grains, and also it could be used for harvesting drilled or broadcasted grains. For example, if one desired to cut the top portions of row crop material, as in the case of kafir, sorghums, beans and like crops, the drive for the auxiliary header could be disconnected and the main header could be utilized in the conventional manner.

Harvester 10 has a main header or cutting mechanism 12 attached to the front thereof. Header 12 includes a trough 14 in which is mounted an auger or conveyor 16. A main sickle or cutter 18 is mounted on the front of the auger trough. Auger 16 is belt or chain driven from the main drive of the machine in well-known manner, and sickle 18 is moved back and forth in the conventional reciprocating manner by means of a pitman drive. The auger and sickle are considered to be conventional and need not be further described, except as required to explain the invention in relation to the normal operation of these parts.

The harvester shown as utilizing the invention includes a reel or beater 20, an auxiliary cutter or sickle 22, an auxiliary auger or conveyor 24 and an auxiliary reel 26. As seen in FIGS. 1 and 2, beater 20 is mounted above and forward of auger 16, conveyor 24 is mounted above and forward of beater 20, and reel 26 is mounted above and forward of conveyor 24.

Auger trough 14 includes side panels 28 and 30 and a bottom panel 32 which curves up at the rear thereof to form a smooth container for the cut crop material as auger 16 moves the material to the center of the trough. Suffice it to say that auger 16 is of the well-known retracting finger type with the flights positioned and formed so as to convey the cut crop material to the center of the auger trough where the material is carried into the threshing mechanism.

As seen in FIGS. 2 and 4, the ground line 34 and corn stalks 36 are shown with ears 38 and a stalk or grain portion 39 about to be harvested. Main header 12 is adjustable in height so as to cut the stalks low if the grain is low, and to cut the stalks high if the grain is high. Varying weather and soil conditions will determine the height that the ears are growing so the header must be set by the operator for the proper cutting height. The operator's prime concern is to cut a minimum of the stalk but still get all the grain. It is thus seen in FIGS. 2 and 4, that if all the grain, or ears, of corn in the present instance, are to be harvested, while using the conventional header only, more than half of the stalk must pass through the harvesting mechanism with the ears of corn.

A majority of this stalk material can be diverted from the harvesting mechanism if an auxiliary header is used to cut the tops of the stalks which includes the stalk tassels. The invention provides for diverting a portion of the stalk material from the harvesting mechanism and in the embodiment shown, an auxiliary header 40 is attached to and supported from the main header 12. As stated above, the auxiliary header 40 includes an auxiliary sickle 22, an auxiliary auger 24 and an auxiliary reel 26. Header 40 has an auger trough 42 which extends across the front of the harvester and is substantially the same length as the main auger trough 14. Trough 42 has a side portion 44, a bottom portion 46, and a rear portion 48, the bottom and rear portions being so shaped as to form a smooth surface for conveying crop material. Auger 16, beater 20, auger 24 and reel 26 are rotatably supported on the left side of their respective headers in bearings 50, 52, 54, and 56 and on the right side of their respective headers in bearings 58, 60, 62 and 64, the right and left side being taken in the direction of travel. As stated above, auger 16 is driven from the main drive of the harvester, as by a belt 66 on a pulley 68 fixed on a shaft 72. Beater 20 is driven from the auger 16, by means of a belt 70 from a pulley 71 adjacent pulley 68 and fixed on auger shaft 72. Belt 70 drives a pulley 74 fixed on a beater shaft 76.

Since the main header parts and the auxiliary header parts turn in the same direction of rotation, as seen in FIG. 2, they could be driven from the same drives on the machine. In the present instance, the auxiliary header is driven from the main header. A pulley 78 is fixed on the opposite end of shaft 76 from pulley 74 and a pulley 80 is fixed on shaft 82 of auger 24. A belt 84 on pulley 78 drives pulley 80 and also auger 24 in a direction to move material as shown in FIG. 4. A pulley 85 is fixed on shaft 82 and adjacent pulley 80. A pulley 86 is fixed on shaft 88 of reel 26 and a belt 90 on pulley 85 and on pulley 86 drives reel 26 in a direction to move the tops 92 of stalks 36 toward the sickle 22. It is thus seen that the drives for the main header are located on one side of the machine and the drives for the auxiliary header are on the opposite side. One reason for this configuration is to provide a free place of discharge for the cut portions of the stalk tops which portions are not desired in the threshing mechanism. As seen in FIG. 4, a short chute or spout 94 is fixed on one end of auger trough 42 which provides for moving the cut top material 96 over and away from the pulleys and drive belts and onto the ground.

Sickle 22 may be reciprocably driven from the main sickle 18, or it may be driven from the main drive of the machine. In the present embodiment, a separate reciprocating drive is taken from the main drive for driving sickle 22. If it were desirable to disconnect the auxiliary header, the sickle drive could also be disconnected without interfering with the operation of the main sickle drive.

As the machine moves down the field, reel 26 contacts and positions the top portions 92 of the stalks 36 for cutting by sickle 22. The cut top portions are then moved by the reel into the auger trough 42 where auger 24 conveys these portions toward one side of the trough and onto the ground. The main header unit then operates to cut and convey the grain portions 39 of the crop material, in the present instance the ears of corn and the middle portion of the stalk, into the harvesting machine. Beater 20 contacts and positions the ears of corn and the stalk for cutting by sickle 18. Beater 20 also tends to help break up the stalk and remove the ears from the stalk prior to the harvesting operation. The cut stalk and ears of corn of the middle portion 39 are moved by auger 16 to a conventional and unshown conveyor which carries the ears and only the middle portion of the stalk to the harvesting mechanism.

It is thus seen that herein disclosed is a device which will remove the top portions of the corn stalks and discharge these portions to the side of the machine. The amount of stalk material that normally goes through the harvesting machine is reduced considerably when a part of the material is diverted from the harvesting mechanism, thus the harvester can operate more efficiently and produce a cleaner grain.

It is to be understood that the embodiment disclosed is intended to be illustrative only, and that modifications will occur to those skilled in the art, and that the disclosure is not to be taken as limited except as defined in the annexed claims. For example, auger 24 may be replaced by another type of conveyor for moving the cut top portions to one side of the auxiliary header. The drives may be varied or may be connected to different drive units and of course, other modifications will be suggested by those skilled in the art.

What is claimed as new and desired to be secured by Letters Patent of the United States is:

1. A harvester of the type having a main header including
   a beater, a sickle, and an auger for positioning and conveying crop material cut by the sickle into said harvester, and an
   auxiliary header mounted on said main header; said auxiliary header including
   means upwardly of said beater for positioning the tops of said crop material for severing thereof,
   means upwardly of said sickle for severing the tops of said crop material, and
   means for conveying the tops of said crop material away from said main header.

2. An auxiliary header for a harvester of the type having a main header including a beater, a sickle and an auger;
   said auxiliary header being mounted on said main header and including
   means upwardly of said beater for positioning the tops of crop material to be cut,
   means upwardly of said sickle for cutting said tops of crop material, and
   means for conveying the cut tops of crop material to one side of said harvester.

3. An auxiliary header for a harvester of the type having a main header for gathering crop material and including a gathering means and a cutter and a conveyor, first drive means on one side of said main header for driving said gathering means and said cutter and said conveyor, said auxiliary header being mounted on said main header and including reel means forwardly and upwardly of said main header for positioning the tops of crop material to be cut, cutter means for cutting said tops of crop material, auger means positioned rearwardly of said cutter means for conveying the cut tops of crop material to one side of said harvester so that said main header cuts only the grain portion of said crop material and conveys said grain portion into said harvester, and second drive means connected with said first drive means and with said reel means and said cutter means and said auger means for driving said auxiliary header.

4. In a harvester of the type for cutting upstanding crop material having non-productive top portions and grain portions intermediate the height of said upstanding crop material, a main header for cutting said crop material and including a conveyor for conveying said crop material into said harvester, and an attachment for said harvester; said attachment including reel means disposed forwardly and above said main header for placing said top portions of said crop material in a predetermined position, cutting means disposed downwardly and rearwardly of said reel means for cutting said top portions of said crop material at a point above said grain portions, and conveyor means rearwardly of said cutting means and positioned for moving said top portions to one side of said attachment and discharging said top portions so that said main header conveys only said grain portions of said crop material into said harvesting mechanism.

5. A harvesting machine comprising a main header including a cutter and a conveyor for cutting crop material and for conveying said crop material into said harvesting machine, and means for driving said main header, an auxiliary header of substantially the same length as said main header and carried on said main header, driving means for said auxiliary header, said auxiliary header having a rotatable reel positioned for placing the top portions of said crop material in a predetermined position, a reciprocable cutter on said auxiliary header for cutting said top portions, and a rotatable auger adjacent said cutter on said auxiliary header and positioned for receiving and conveying said top portions of said crop material to one side of said machine so that only the grain portions of said crop material will be conveyed into said harvesting machine.

References Cited

UNITED STATES PATENTS

| | | | |
|---|---|---|---|
| 2,281,904 | 5/1942 | Wurtele | 56—17 |
| 2,401,513 | 6/1946 | Schmidt | 56—238 |
| 3,031,833 | 5/1962 | Nelson | 56—238 |
| 3,325,982 | 6/1967 | Fogels et al. | 56—60 XR |

ANTONIO F. GUIDA, *Primary Examiner.*